Nov. 29, 1932.   G. A. LUTZ   1,889,414
WELDING APPARATUS
Filed May 13, 1930   3 Sheets-Sheet 1
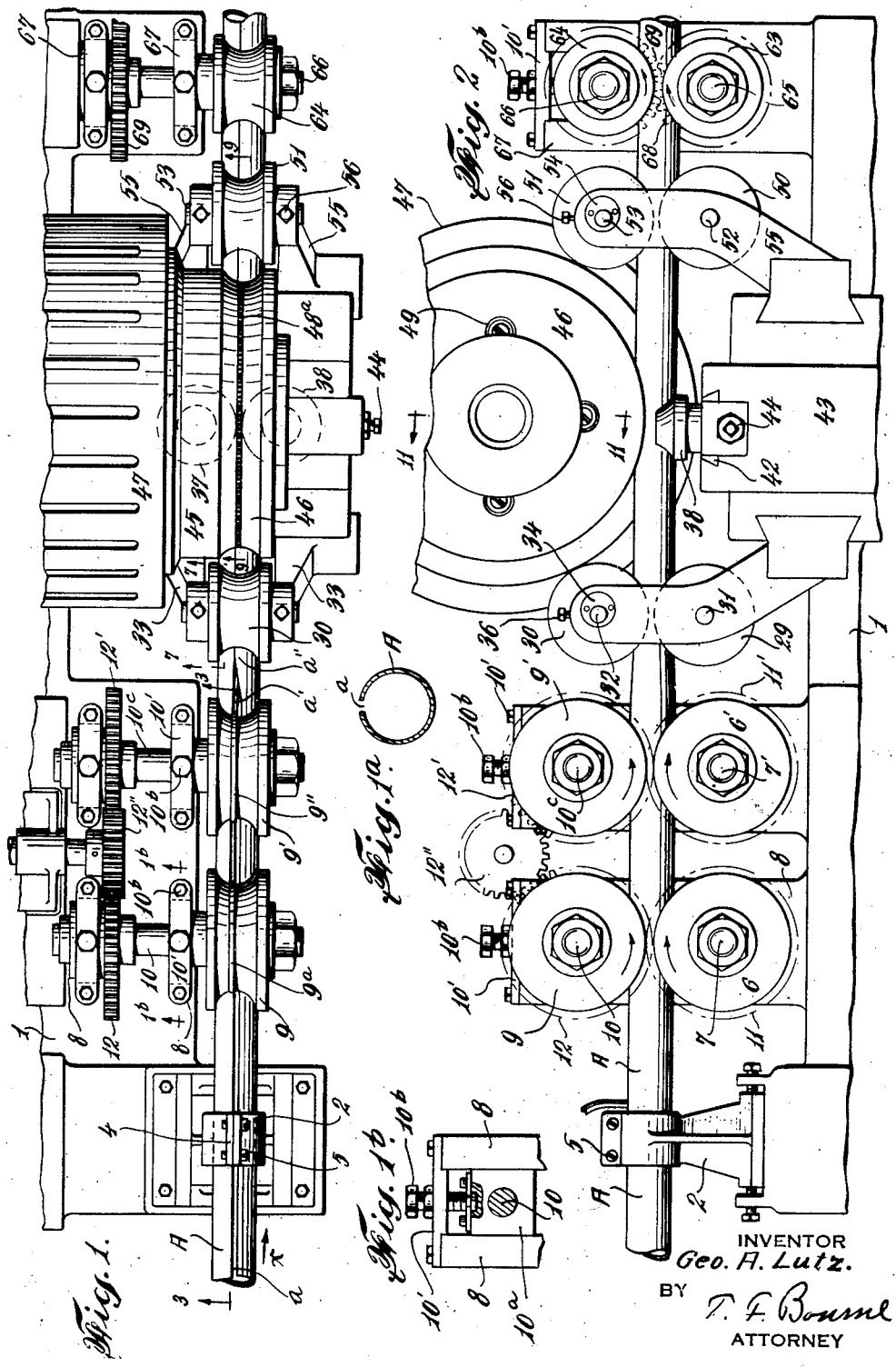
INVENTOR
Geo. A. Lutz.
BY
T. F. Bourne
ATTORNEY Nov. 29, 1932.   G. A. LUTZ   1,889,414
WELDING APPARATUS
Filed May 13, 1930   3 Sheets-Sheet 2
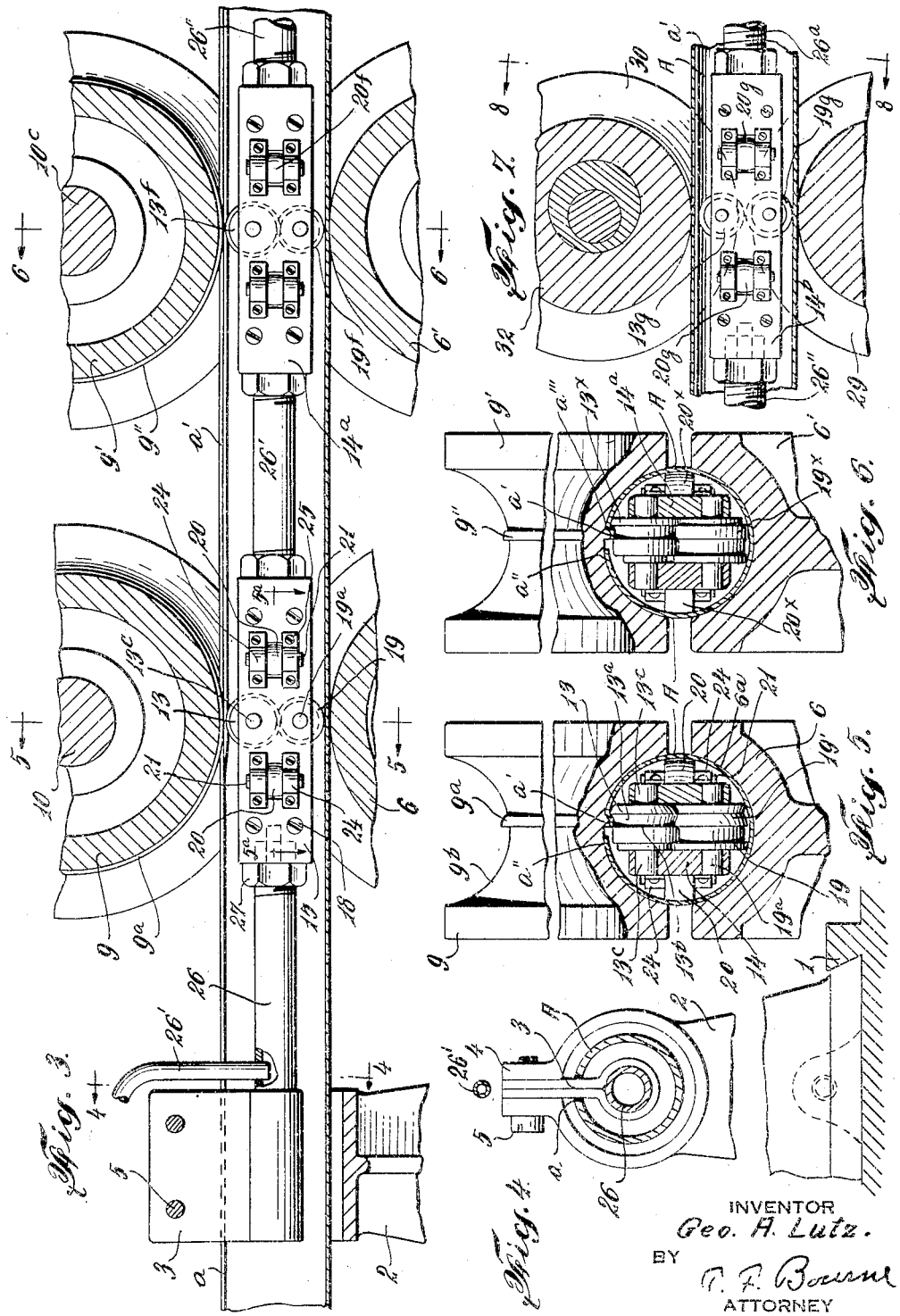
INVENTOR
Geo. A. Lutz.
BY
T. F. Bourne
ATTORNEY Nov. 29, 1932.  G. A. LUTZ  1,889,414
WELDING APPARATUS
Filed May 13, 1930  3 Sheets-Sheet 3
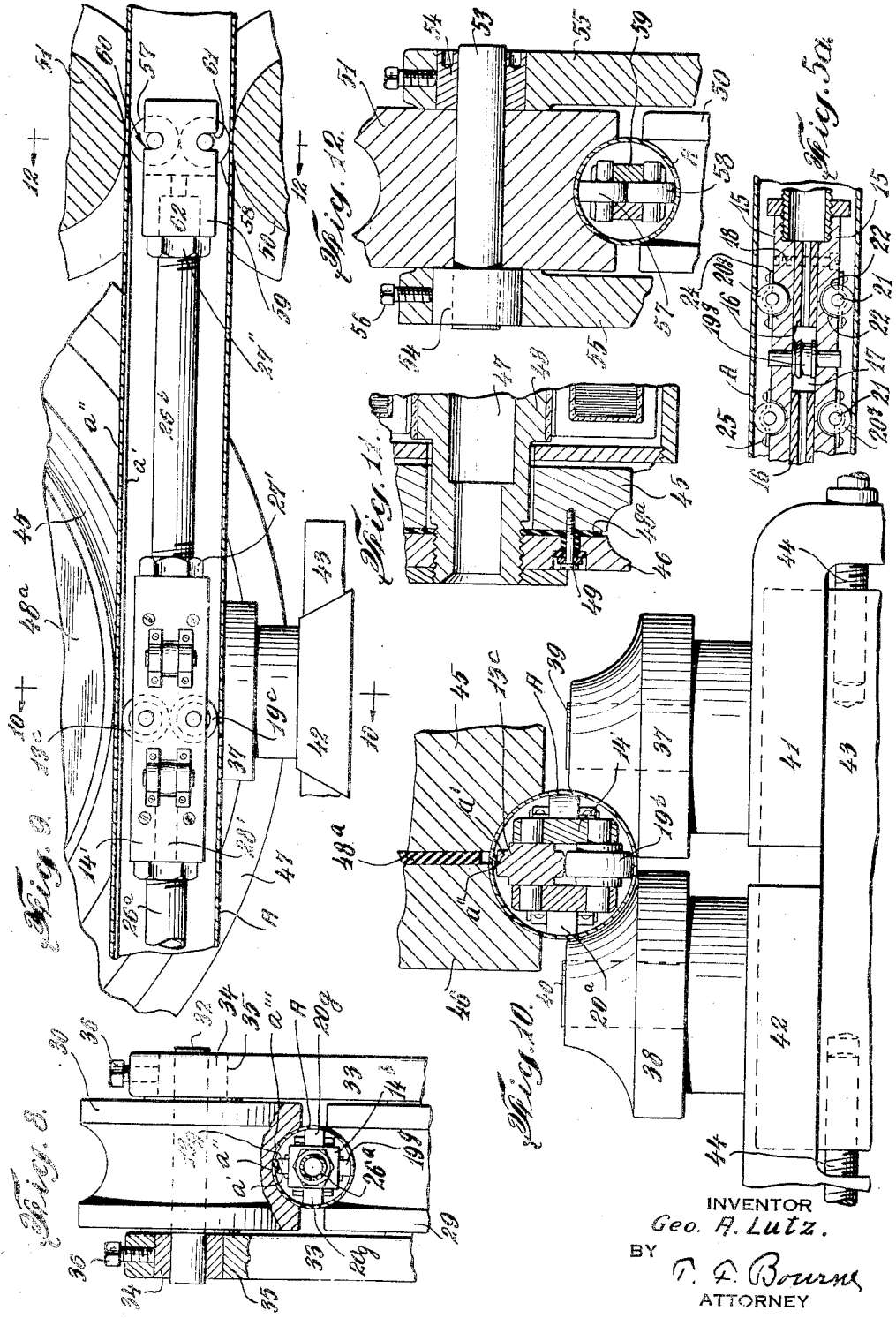
INVENTOR
Geo. A. Lutz.
BY
T. F. Bourne
ATTORNEY Patented Nov. 29, 1932

1,889,414

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

WELDING APPARATUS

Application filed May 13, 1930. Serial No. 451,896.

My invention relates to improvements in the art of lap-welding the marginal portions of a tubular metal blank. In my applications for improvements in method of and means for lap-welding, filed March 10, 1930, Serial No. 434,496, and April 23, 1930, Serial No. 446,463, I have set forth means to cause adjacent marginal portions of a tubular metal blank to be overlapped and to be welded together, the overlapped marginal portions finally being squeezed or compressed while at a welding temperature, whereby said overlapped portions may be reduced substantially to the gage of the metal of the blank thereby substantially eradicating the appearance of a lapped seam, and providing a smooth condition along the welded portion.

In accordance with my present invention I offset, such as by deflecting or bending, at least one of the marginal portions of a tubular metal blank with respect to adjacent metal thereof, and overlap the two marginal portions of the blank along its open seam, so that an edge of one of said portions opposes the metal of the blank adjacent to the offset part of the blank, and I pass said overlapped portions, while the blank traverses longitudinally, to a heating place for heating said overlapped portions to a welding temperature. After such welding I may squeeze or compress said heated overlapped portions to a desired degree, whereby said portions may be reduced substantially to the gage of the metal of the blank.

In accordance with the construction illustrated in the accompanying drawings I provide a pass for the metal blank including means to offset or deflect a marginal portion of the blank along its open seam, with respect to the adjacent metal of the blank, means to traverse the blank, means to reduce the diameter of the blank and cause one marginal portion to overlap or nest against said offset or deflected portion, spaced electrodes, and guiding means for the blank to retain the overlapped portions thereof in contact at the electrodes.

A suitable electric current is passed through said overlapped portions at the electrodes for heating the said portions to a welding temperature, for welding said portions together. By preference the aforesaid means for causing overlapping of the marginal portions of the blank serve to compress said portions to provide a substantially definite thickness of said lapped portions while they are being lapped for passage to the electrodes. At a suitable distance from the electrodes in the direction of travel of the blank I provide means to compress the heated overlapped portions of the blank and reduce them to a desired thickness.

My invention also comprises novel details of improvement that will be hereinafter set forth and then pointed out in the claims.

Reference is to be had to the accompanying drawings in which Fig. 1 is a plan view of a welding machine embodying my improvements; Fig. 1a is a detail sectional view of a tubular blank; Fig. 1b is a detail section on line 1b, 1b, in Fig. 1; Fig. 2 is a side view of Fig. 1; Fig. 3 is an enlarged section substantially on line 3, 3, in Fig. 1; Fig. 4 is a cross section on line 4, 4, in Fig. 3; Figs. 5 and 6 are cross sections on line 5, 5, and 6, 6, respectively, in Fig. 3; Fig. 5a is a section on line 5a, 5a, in Fig. 3; Fig. 7 is an enlarged cross-section on line 7, 7, in Fig. 1; Fig. 8 is a cross-section substantially on line 8, 8, in Fig. 7, part being broken away; Fig. 9 is an enlarged section substantially on line 9, 9, in Fig. 1; Fig. 10 is a section substantially on line 10, 10, in Fig. 9; Fig. 11 is a detail section on line 11, 11, in Fig. 2; and Fig. 12 is a section on line 12, 12, in Fig. 9.

Similar numerals indicate corresponding parts in the several views.

A main frame is indicated at 1, which may be of any suitable construction. At 2 is indicated a support, carried by frame 1, through which a tubular metal blank A passes, which blank has an open seam at a (Fig. 1a). At 3 is a guiding member having a position within the support 2 and extending through the seam a to keep its edges spread apart and guide the blank as it passes through the machine. The support 2 is shown split at the upper part 4 to receive the member 3 and clamped against the latter by means of screws 5, (Fig. 4). At a suitable distance from the support 2 feeding or traversing means for the blank A are provided, and said means serve to offset or bend a marginal portion of the tubular blank from its normal circular condition. A grooved blank-guiding roller is indicated at 6, shown carried by a shaft 7 that is mounted in supports 8 on the main frame, (Figs. 1, 1b and 2), the tubular blank being guided by said roller as the blank travels. Suitably spaced from the roller 6 is a grooved roller 9, said rollers providing a pass or throat for the tubular blank. The roller 9 is secured to a shaft 10 journaled on the supports 8. The shafts 7 and 10 are provided with intermeshing gears at 11 and 12, causing rotation of said rollers 6 and 9 together, (Fig. 2). Either of said gears may be driven by any suitable means. The roller 9 is provided with means to offset, preferably inwardly, the marginal portion a' of the tubular blank, with respect to the adjacent metal of the blank, without necessarily changing the normal diameter or circular condition otherwise of the tubular blank, in such a way that the marginal portion a'' of the tubular blank may be lapped against the offset marginal portion a', as indicated in Figs. 8 and 10.

The roller 9 is shown provided with an outwardly extending annular rib 9a located in such position and having a suitable contour to engage the marginal portion a' of the tubular blank to bend the same or offset it inwardly, (Fig. 5). The grooved surface 9b of roller 9 may be substantially on the radius of the tubular blank, as may also the groove 6a of the roller 6, so that the pass between said rollers for the tubular blank will be substantially of the same contour or area as the normal circumference or area of the tube blank except at the rib or projection 9a. I provide means within the tube blank to engage the latter at the portion adjacent to the margin a' thereof to co-operate with projection or rib 9a of roller 9 in bending or offsetting the marginal portion a', as illustrated in Figs. 3 and 5. At 13 is a roller within the tube blank and opposed to the roller 9, which roller 13 has a peripheral reentrant portion or groove 13a which preferably conforms with or is substantially complemental to the contour of projection or rib 9a, so that the margin a' of the tube blank will be bent or offset between said rollers as the tube traverses through the pass between the rollers 6 and 9. The roller 13 may have a radial shoulder 13b against which the edge of the portion a' of the blank bears to aid in keeping the tube in proper position with respect to roller 9.

The roller 13 is journaled on a frame 14 maintained within the tube blank between the rollers 6 and 9. The frame I have illustrated is substantially the same as that set forth in my aforesaid application and comprises two side bars 15 of suitable length, spaced apart by blocks 16 that are spaced from each other to provide an opening 17 within which the roller 13 is located, (Figs. 5 and 5a). The parts 15 and 16 are secured together by screws 18. The bars 15 are provided with holes within which the pivots 13c of roller 13 are journaled. Below the roll 13 is another roll 19 having its pivots 19a journaled in the side bars 15 of frame 14, the roll 19 being adapted to bear against the inner surface of the tube blank, as indicated in Fig. 5, the periphery of roll 19 suitably conforming to the curvature of the blank A. The roll 19 is provided with a peripheral portion 19' co-operative with the portion 13a of roll 13. As the tube blank travels between the rollers 6 and 9 the rolls 13 and 19 engage the corresponding inner surfaces of the blank, whereby the compression pressure of the projection 9a will be resisted by rolls 13, and 19, and roller 6. To keep the frame 14 in proper position in a lateral direction within the tube blank I provide said frame with horizontally disposed inwardly projecting rolls 20, shown provided with vertically extending pivots 21, Fig. 3. The bars 15 are shown provided with laterally disposed recesses 22 in which the rolls 20 are received, and said bars also have seats, above and below the recesses 22, in which the pivots 21 are rotatively seated. Straps 24 are secured by screws 25 to the outer sides of the bars 15 in front of the pivots 21, whereby the latter are journaled between the seats and said straps. The rollers 20 are in such position as to engage opposite sides of the inner surface of the tube blank to keep the rolls 13 and 19 in proper position. The rolls 13 and frame 14 are substantially the same as set forth in my aforesaid application. The frame 14 is supported within the tube blank by contact of the roller 19 with the latter that rests upon the roller 6, and said frame is guided or retained in position by an arm or bar 26 that is shown secured in member 3 and projects therefrom toward said rolls. The bar 26 is shown secured to the frame 14 by means of screw threads and a securing nut 27, whereby the position of said frame may be adjusted longitudinally of the tube blank for registering the rolls 13 and 19 with their axes in the desired vertical plane, substantially in the axes of the rollers 6 and 9, (Fig. 3). By preference the arm 26 is tubular and receives a tube 26' from a source of water supply to furnish water through said arm into the tube blank for cooling the rollers therein, substantially as set forth in my aforesaid application. The pressure of the rollers 6 and 9 may be varied as desired. The shaft 10 is journaled in bearing blocks 10a guided in the supports 8, the blocks being provided with adjusting screws 10b, swivelled in said blocks and operative in caps 10', (Figs. 1 and 1a), for effecting the bending or offsetting of the margin a' of the tube blank as desired.

Where the gage of the tube blank a' permits, such as with so-called thin walled tubes, one pair of rollers 6 and 9 may suffice for off-setting or bending the margin a' of the tube blank. Where, however, the gage of the metal will not lend itself with facility for desired bending or offsetting the marginal portion a' of the tube blank several sets of rollers may be provided, as illustrated in the accompanying drawings. For such purpose I have shown a second set of rollers 6' and 9' mounted on corresponding shafts 7' and 10c supported in manner described with respect to the shafts 7 and 10, and with respect to Fig. 1b, the rollers 6' and 9' being suitably spaced from the rollers 6 and 9 in the direction toward the place of heating the marginal portions of the tube blank, Fig. 2. The roller 6' will be provided with a bear 11' and the roller 9' will be provided with gear 12', and an idle gear at 12'' meshes with the gears 12 and 12', whereby the several pairs of such rollers will rotate in unison in corresponding directions, as illustrated in Fig. 2. The roller 9' is shown provided with a projection or rib 9'' having a suitable contour adapted to giving final set to the marginal portion a' of the tube blank as pre-set between projection 9a of the roller 9, whereby the step a''' at point of junction between the tube blank and the offset portion a' may be more sharply defined as illustrated in Fig. 6. A frame 14a having rollers 13f and 19f and with side rollers 20f is provided between the rollers 6' and 9' to function in a manner described with respect to frame 14 and its rollers between the rollers 6 and 9. The two frames 14 and 14a are shown connected together by a tubular arm 26', Fig. 3. After the marginal portion a' of the tube blank has been offset in the manner described the two marginal portions a' and a'' are to be overlapped to be welded together. At 29 and 30 are spaced peripherally grooved guiding rolls, spaced from the blank off-setting rollers, providing a guiding throat or pass for the tube blank having the offset marginal portion a', the area of the said throat or pass being less than the area of the pass between the rollers 6 and 9 (and between the rollers 6' and 9' when the latter are provided), and also less than the normal area of the tube blank before its marginal edge a' is offset, whereby as the tube blank travels through the pass between the rolls 29 and 30 the blank will be reduced in diameter and the marginal portion a'' of the blank will be lapped on or against the offset or bent marginal portion a', the latter being tucked under the portion a'', as illustrated in Fig. 8. Said rolls have shafts 31 and 82 journaled in supports 33 on the main frame. At least one of said shafts may be adjustable from and toward the tube blank for which purpose I have shown shaft 32 journaled eccentrically in rotatively adjustable bearing blocks 34 set in bores 35 in the supports 33 and adapted to be retained in adjusted positions by screws 36, Figs. 2 and 8, whereby desired pressure of the rolls 29 and 30 on the tube blank may be adjusted and maintained for causing the desired lapping of the marginal portions a' and a'' of the tube blank. The peripheral grooves of the rollers 29 and 30 are preferably of similar radius so that the pass between said rollers, as defined by said grooves, will be such as to properly reduce the diameter of the tube blank as it travels and cause the inner edge of the margin a'' to oppose or substantially contact with the inwardly turned step a''' of the tube blank adjacent to the offset margin a' thereof, (Fig. 8). Within the tube blank, between the rolls 29 and 30, I preferably provide a frame 14b having rolls 13g and 19g and side rolls 20g, as illustrated in Figs. 7 and 8. The roll 13g bears against the deflected portion a' of the tube blank and the roll 19g bears against the lower portion of said blank, with the rolls 20g bearing against the side portions of the blank. Said frame and rolls are substantially similar to the frame 14 and its rolls and is shown connected with frame 14 by an arm 26'' (which may be tubular). The roll 13g has a suitable periphery to bear against the deflected marginal portion a' of the tube blank. Desired pressure of the rolls 30 and 13g against the lapped marginal portions a' and a'' of the tube blank may be effected by adjustment of the screws 36, whereby a substantially definite or fixed thickness of said lapped portions may be produced, in the nature of a cold-rolling of said portions, as the blank travels toward the heating place.

At a suitable distance from the rollers 29 and 30 are located means for heating the overlapped marginal portions a', a'' of the tube blank for welding them together. I have illustrated electric heating means for said portions of the blank, and at the heating place guiding means for the tube blank are provided. I have shown said means comprising grooved rollers 37 and 38 journaled upon pivots 39 and 40 carried by blocks 41 and 42. Said blocks are shown guided for lateral adjustment on a member 43 of the main frame and provided with screws 44 co-operative with the parts 41, 42 and 43 for adjusting said rolls radially as required, Figs. 2 and 10. Above the rolls 37 and 38 are rotary electrodes 45 and 46, shown having grooved peripheries to engage the corresponding portions of the tube blank. The electrodes 45 and 46 are spaced apart and insulated from each other and may be supported in any desired way. I have illustrated said electrodes in connection with a welding machine of the rotary transformer class, such as illustrated in Letters Patent to me 1,594,891, granted August 3, 1926, and in Letters Patent 1,478,262 issued December 18, 1923, to Snodgrass and Hunter. At 47 is illustrated a portion of a transformer of the rotary secondary type, to the secondary 48 of which transformer the electrodes 45 and 46 may be connected in any desired or well known way, Figs. 1 and 11. The electrodes are shown spaced apart by suitable insulation at 48a and are connected together by insulated screws 49. The electrodes have suitably curved contact surfaces adapting said electrodes to properly contact with the adjacent portions of the tube blank A as indicated in Fig. 10. The grooves of said electrodes may be substantially on the same radius, which radius substantially corresponds to the radius of the tube blank when its marginal portions $a'$ and $a''$ are overlapped, as indicated in Fig. 10. The spacing between the electrodes is such that current will flow through the overlapped marginal portions of the tube blank with the joint between the edge of the portion $a''$ and the opposing portion $a'''$ of the tube blank in register with said space, so that the portion of the blank that engages one electrode will not also engage the other electrode. The current supplied by the transformer for the electrodes will traverse from one electrode to the other only through the metal in contact at the overlapping marginal portions of the tube blank. I provide means within the tube blank to bear or abut against the latter in opposition to the pressure thereon of the electrode 46 which is so located as to bear against the marginal portion $a''$ where it overlaps the offset portion $a'$ of the blank, so as to suitably compress said portions and keep the same in contact with each other for the passage of current through such portions and between the electrodes. I have illustrated a frame and rollers within the tube blank of substantially the same construction as that regarding frame 14, as illustrated in Figs. 9 and 10. From the frame 14a a tubular arm or bar 26a is extended forwardly, in the direction of travel of the tube blank, and is connected with a frame 14' and provided with a bore at 28' for admitting water into frame 14'. The frame 14' is provided with a roller 13c having a portion to bear against the offset marginal portion $a'$ of the tube blank opposite the overlapping marginal portion $a''$ of the blank in register with the electrode 46. By preference the roll 13c is of such configuration as only to engage the portion $a'$ of the tube blank, in the normal condition of the latter, and not to engage the tube blank opposite the electrode 45. During compression pressure of the electrode 46 in register with the overlapped marginal portions $a'$, $a''$ of the blank the lateral edge of the portion $a''$ will oppose the adjacent bent step portion $a'''$ of the tube blank, outside of the inset portion $a'$, and thereby keep the said portions of the tube blank in proper relation and limit the folding or movement of the marginal portions of the blank toward each other due to the compression pressure on the blank of the electrodes as resisted by the guiding means 37 and 38. The frame 14' is also provided with a roller 19b to bear on the lower portion of the tube blank, and the rollers 13c and 19b may engage one another to resist compression pressure of the electrodes on the tube blank. The frame 14' is also provided with side rollers 20a to engage the inner surface of the tube in manner described with respect to the rolls 20.

The pressure of roll 13c against the offset portion $a'$ of the tube blank aids in pressing the blank against both electrodes. As the overlapped portions of the blank travel between the electrode 46 and the roll 13c said portions will be squeezed firmly together for required electric contact between the heated portions, with the portion $a''$ in contact with said electrode, during which period electric current of suitable amperage will flow between the electrodes across the said overlapped portions of the tube blank to create a welding heat thereat. When the overlapped marginal portions of the tube blank are sufficiently heated between the electrode 46 and the roll 13c I am enabled to so compress or squeeze said overlap together as to effect a weld therebetween by causing a suitable pressure of said electrode and roll against said portions of the blank. By having the roll 13c normally opposing only the overlapped portions $a'$, $a''$ of the tube blank I am enabled to compress said portions to a desired degree, with the resistance from said roll. It is desirable that the areas of the overlapping portions $a'$, $a''$ of the tube blank be not more than the combined thickness of said overlapped portions between electrode 46 and roll 13c to regulate or confine the welding area to a narrow zone laterally.

While the pressure created by the co-operation of the electrode 46 and the roll 13c between the overlapping marginal portions $a'$ and $a''$ of the tube blank may be sufficient to cause said portions to be welded together, due to the welding heat produced thereat, it is desirable to compress said overlapped portions while the metal is still at a suitable welding temperature. By utilizing sufficient pressure I reduce the combined thickness of said overlapped portions to any desired extent, such as substantially to the gage of the tube blank, and form a uniform weld, substantially without burs or ridges along the welded portions of the blank, as illustrated in Figs. 9 and 12.

I have illustrated compressing rollers for the overlapped heated portions of the blank, between which rollers said portions are compressed as the tube travels. The tube blank passes through a throat or pass formed between grooved rollers 50 and 51 which are shown carried by shafts 52 and 53 that are journaled in uprights on frame 1. By preference the roller 51 is adjustable toward and from the roller 50 for which purpose I have shown shaft 53 eccentrically journaled in sleeves 54 rotatively supported in bearings in uprights 55 and retained in set position by screws 56, (Fig. 12). The area of the throat or pass between the grooved rollers 50 and 51 is substantially that of the cross-sectional area of the finished welded tube, and correspondingly greater than the area of the pass between electrodes and the rolls 37 and 38. Within the tube blank are roller means to serve with the roller 51 to engage the inner surface of the blank along the offset portion a' of the tube blank, being along the welding line, for compressing or welding down the heated overlapped marginal portions a', a" of the blank. I have shown a roll 57 to engage the inner surface of the offset portion a' of the tube blank along the welding line in opposition to roller 51, and a roll 58 to engage the lower surface of the tube blank in opposition to the roller 50, the distance between the diametrically opposing surfaces of the rolls 51 and 57 being such that the overlapped marginal portions a', a" of the tube blank must be squeezed, such as to reduce them substantially to the gage thickness of the metal of the blank. In other words, the space between the opposing contacting portions of roller 51 and roll 57 may correspond substantially to the gage of the metal of the blank, so that when the heated overlapped marginal portions of the blank are forced between roller 51 and the roll 57 such metal will be compressed or squeezed to form a single thickness.

During such compressing or squeezing of the metal the walls of the tube blank will expand outwardly, due to the flow of the metal from the overlapped portions, to form the finished welded tube to the desired diameter, since the throat between the rollers 50 and 51 is of greater transverse sectional area than the throat between the electrodes and the guiding and supporting rollers 37 and 38. The rolls 57 and 58 are shown retained in position and guided by a head or block 59 shown carried by the tubular arm 26b that is attached to and extends from the frame 14' (Fig. 9). The block or head 59 is shown provided with recesses 60 and 61 receiving the pivots of the rolls 57 and 58. The tubular arm 26b is shown attached to the frame 14' by screw threads and retained by clamping nut 27', and said arm is also shown attached to the head 59 by screw threads and retained by clamping nut 27", whereby the position of the rolls 57 and 58 may be adjusted with respect to the rollers 50 and 51. The tubular arm 26 will deliver cooling water to the rolls 57 and 58 through a bore 62 in head 59.

Tube feeding rollers are indicated at 63 and 64 carried by shafts 65 and 66 journaled in uprights 67 supported by the main frame. The shafts 65 and 66 are provided with gears 68 and 69 in mesh for rotating said rollers in the same direction in unison. Desired pressure of the grooved rollers 63 and 64 upon the tube may be effected by adjusting the shaft 66 vertically in manner described in respect to shaft 10. Either of the shafts 65 or 66 may be power driven in any suitable way. The compressing and tube feeding devices described are substantially the same as in my aforesaid applications.

In accordance with my invention the tube blank A, having an open seam a, is fed between the rollers 6 and 9 whereby the marginal portion a' of the blank is offset or bent substantially radially sufficiently far to permit the other marginal portion a" to be lapped over the portion a' (one or more pairs of such tube offsetting rollers being used as desired).

As the tube blank travels in the direction of the arrow x (Fig. 1) the marginal portions a', a" travel through the throat between the rollers 29 and 30, and as said throat is of less cross-sectional area than the pass between the rollers 6 and 9 the tube blank will be circumferentially compressed in said throat to cause the marginal portions a' and a" to be overlapped in manner indicated in Fig. 8, and the thickness of the lap is determined, said throat retaining the said portions overlapped, whereupon the tube blank passes through the throat between the electrodes and the guiding means or rolls 37 and 38, said throat being of such area as to retain the portions a' and a" in overlapped condition, as shown in Fig. 10. The overlapped marginal portions of the tube blank are firmly pressed into contact between the electrode 46 and the roll 13c, whereby electric current from the secondary of the transformer is caused to flow, with suitable amperage, from one electrode to the other through the overlapped marginal portion of the tube blank to heat said portions to a welding temperature. Since the inner edge of the overlapped portion a" of the tube blank opposes the adjacent portion a''' on the opposite side of the tube blank, and since the overlapped marginal portions are compressed between electrode 46 and roll 13c, the overlapped portions will be maintained in proper relation and guided in conjunction with the curvature of the portions of the electrodes contacting with the blank, as well as the guiding means 37 and 38 for the blank, the overlapping marginal portions of the blank will be kept in contact for welding. Said marginal portions are, therefore, heated to the desired fusing or welding degree, and the compression pressure against said portions caused by the electrode 46 and roll 13c causes welding of said portions together. While the marginal portions are so heated to a welding temperature they pass to the compressing or ironing rolls 50 and 51 where such heated overlapped margins of the blank are compressed or ironed down to a desired thickness, such as corresponding to the gage of the metal of the blank, and the welded tube is delivered in a desired shape and diameter. The operation is such that the finished tube will be welded at the lapped portions of the blank in a smooth way without undesired burs or extrusions and without exhibiting the offset portion a' of the metal along the previously lapped portions.

In accordance with my invention, by having a marginal portion of the tube blank offset from the normal or circular condition of the blank, and by causing the other marginal portion of the blank to be lapped on said offset portion, I am enabled to pass through the throat at the electrodes a blank having a substantially uniform exterior outline or configuration, whereby the grooved portions of the electrodes may be substantially on the same radius. My invention is distinguished from the well known butt-welding of tubes where the edges of the seams are abutted and so welded, whereby burs or extrusions along the metal of the seam, both exterior and interior, usually result, requiring subsequent removal of the burs to produce a smooth appearing seam, and whereby more or less waste has occurred, and cost has increased. In accordance with my invention there is no waste material at a seam because no burs are produced requiring removal of metal extruded during welding, and I produce a more substantial weld than is obtained during the butt-welding referred to.

Having now described my invention what I claim is:—

1. A welding apparatus comprising means to offset a marginal portion of a blank with respect to adjacent metal thereof, means to lap said offset portion against another marginal portion, and compress the lapped portions to a definite thickness, means to traverse the blank, and means to heat said overlapped marginal portions while the tube is traveling.

2. A welding apparatus comprising roller means having grooved peripheral portions of substantially the diameter of a tubular metal blank having an open seam, the said means including means to offset a marginal portion of the tubular blank with respect to adjacent metal of the blank, means to cause said offset marginal portion and another marginal portion of the blank to lap one upon another, and compress said lapped portions to a definite thickness, means to traverse said blank, and means to heat said marginal portions of the blank and cause contact thereof.

3. A welding apparatus comprising a roller having a groove whose surface substantially corresponds to the surface of a tubular blank having an open seam, means to retain said blank in contact with said roller, said roller and said means having co-operative portions to offset a marginal portion of said blank with respect to an adjacent portion of the blank, guiding means having a pass of less diameter than said blank to cause the offset portion of the blank to be lapped opposite the adjacent marginal portion thereof, means to traverse the blank, means to heat the lapped portions of the blank, means within the blank to cause said portions of the blank to contact with one another for welding the heated lapped portions together.

4. A welding apparatus comprising a roller having a groove, guiding means for a tubular blank having an open seam to guide said blank into engagement with said roller, said guiding means and roller providing a pass between them for the tubular blank of substantially the cross sectional area of the blank, means within the pass to engage the blank, said means and the roller having co-operative projecting and reentrant portions to offset a marginal portion of the tubular blank with respect to adjacent material thereof, means to traverse the blank through said pass, means providing a throat having a smaller area than the area of said pass to cause lapping of said offset marginal portion of the blank and the other marginal portion thereof, and means to heat said overlapped portions of the blank as the tube travels.

5. A welding apparatus comprising a roller having a groove and an annular projection therein, a roller having a groove opposing the first named roller providing a pass between the rollers for the passage of a tubular blank having an open seam, a roller having a groove opposing said projection and located within said pass whereby a marginal portion of the blank will be offset between said projection and groove as the blank travels, means to traverse the blank through said pass, means providing a throat for the blank of less cross sectional area than the latter to cause lapping of marginal portions of the blank, a pair of spaced electrodes insulated from each other, means to guide the blank and press the overlapped portions of the blank into contact and different portions of the blank in contact with the respective electrode, and means to cause electric current to flow between the electrodes through the overlapped contacting portions of the blank.

6. A welding apparatus comprising means providing a pass for a tubular metal blank having an open seam, said pass being of substantially the cross sectional area of the blank, said pass being provided with means to offset one marginal portion of the blank with respect to the adjacent metal of the blank and the other marginal portion thereof, means to traverse the blank, a pair of spaced electrodes insulated from each other to engage the blank adjacent to the overlapped portions thereof, guiding means for the blank adjacent to the electrodes providing a throat having a cross sectional area less than the area of the said pass, means within the blank to cause contact of the overlapped portions of the blank and contact of spaced portions of the blank with said electrodes, means to cause current to flow between the electrodes through the overlapped portions of the blank, and means to compress the heated overlapped portions of the blank, said means including a throat of greater cross sectional area than the first named throat whereby during compression of the heated overlapped portions of the blank the walls of the tube may expand to a cross sectional area greater than that of the first named throat.

7. A welding apparatus comprising means providing a pass for a tubular metal blank having an open seam, means to traverse the blank, means in the pass to deflect a marginal portion of the tubular blank, and means providing another pass for the blank of less cross sectional area than the first named pass to reduce the cross sectional area of the blank as it travels from the first named pass and cause lapping of the marginal portions of the blank and compression of the lapped portions of the blank to a definite thickness.

8. A welding apparatus comprising means to lap an off-set marginal portion of a tubular metal blank against another marginal portion of the blank and compress said lapped portions to a definite thickness, means to traverse the blank, and means to heat the said lapped and compressed portions of the blank to a welding temperature.

9. A welding apparatus comprising means to compress an off-set marginal portion of a tubular metal blank against another marginal portion of the blank, a pair of spaced electrodes to engage the blank on opposite sides of the lapped portions, means within the blank to engage a lapped portion of the blank to force said portion against the other lapped portion of the blank and force the latter portion against one of the electrodes, and means to traverse the blank.

10. A welding apparatus comprising a pair of opposed grooved rollers providing a pass therebetween for a tubular metal blank having an offset marginal portion lapped against another marginal portion of the blank, means within said pass to cause compressing of the lapped portions of the blank to a definite thickness between said means and one of said rollers, means to traverse the blank, and means to heat said lapped compressed portions of the blank to a welding temperature.

11. A welding apparatus as set forth in claim 10 in which the means to heat the lapped compressed portions of the blank includes a pair of spaced electrodes and means to press the lapped compressed portions of the blank against one of said electrodes.

GEORGE A. LUTZ.